Figure 1:
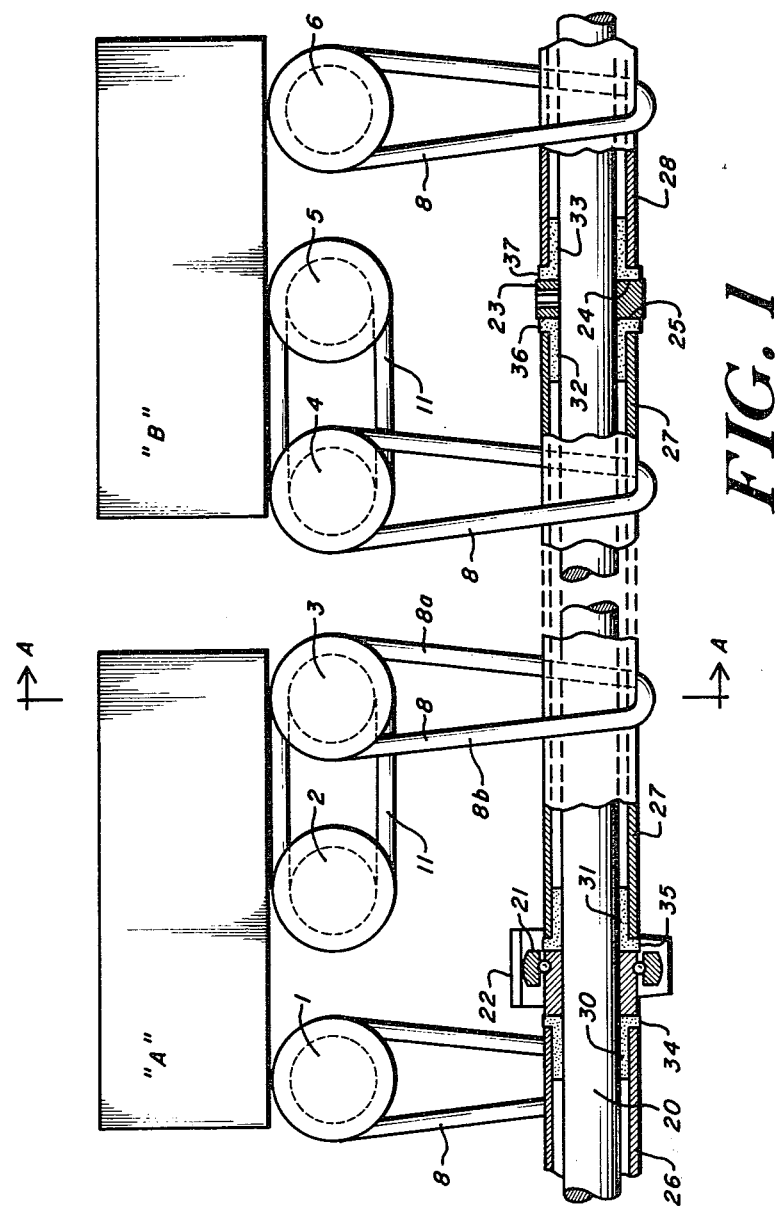

United States Patent [19]

Chorlton

[11] 4,355,715
[45] Oct. 26, 1982

[54] ROLLER CONVEYOR PERMITTING LOW PRESSURE ACCUMULATION OF ARTICLES

[75] Inventor: Derek C. Chorlton, Stafford, England

[73] Assignee: Conveyor Manufacturing Company, Ltd., England

[21] Appl. No.: 210,679

[22] Filed: Nov. 26, 1980

Related U.S. Application Data

[63] Continuation of Ser. No. 966,587, Dec. 5, 1978, abandoned.

[30] Foreign Application Priority Data

Dec. 9, 1977 [GB] United Kingdom ............... 51476/77

[51] Int. Cl.³ .............................................. B65G 13/06
[52] U.S. Cl. ...................................... 198/781; 198/790
[58] Field of Search ............... 198/780, 781, 783, 789, 198/790, 791; 474/62, 63

[56] References Cited

U.S. PATENT DOCUMENTS

| | | | |
|---|---|---|---|
| 3,650,375 | 3/1972 | Fleischauer et al. | 198/790 |
| 3,696,912 | 10/1972 | Fleischauer et al. | 198/781 |
| 3,840,110 | 10/1974 | Molt et al. | 198/781 |
| 3,961,700 | 6/1976 | Fleischauer | 198/790 |
| 4,006,816 | 2/1977 | Werntz | 198/790 X |

Primary Examiner—John J. Love
Assistant Examiner—Douglas D. Watts
Attorney, Agent, or Firm—Kenway & Jenney

[57] ABSTRACT

A roller conveyor includes driven rollers, drive to which is transmitted through resilient drive belts looped about the rollers and about drive sleeves carried for rotation on and frictional engagement with a drive shaft, which extends longitudinally of the conveyor and adjacent the rollers. The drive sleeves consist of tubes carried on the shaft on nylon bush bearings and are restrained from axial movement along the drive shaft and the drive belts are in direct engagement with the surface thereof to assume a stable position thereon. When an article being transported is halted by external means the frictional drag between the bushes and the shaft is exceeded and the sleeve beneath the article and all associated rollers stall, thus preventing further articles being transported by those rollers.

9 Claims, 2 Drawing Figures

ROLLER CONVEYOR PERMITTING LOW PRESSURE ACCUMULATION OF ARTICLES

This is a continuation of application Ser. No. 966,587, filed Dec. 5, 1978, now abandoned.

This invention relates to roller conveyors used for transporting individual articles and is particularly concerned with a method and apparatus for allowing low pressure accumulation of articles to occur.

Roller conveyors, in which rollers are driven by external means, frequently continue to transport articles even after one article has been stopped for example by becoming jammed against the side of the conveyor. As a result succeeding articles join the stoppage and are subjected to pressure from behind which can result in the build up of damaging pressure against the original stoppage. In order to clear such a stoppage it is generally necessary for the whole length of the driven conveyor to be stopped. The present invention is directed to preventing such an undesirable build up of pressure by providing for a section of the conveyor including a group of rollers adjacent the stoppage to be stalled thereby preventing further articles entering that section and allowing a low pressure accumulation of articles to occur.

Accordingly the present invention provides a driven roller conveyor comprising a frame, a plurality of rollers carried by said frame for free rotation therein, a drive shaft supported for rotation and extending adjacent said rollers and at an angle thereto, drive means to drive said drive shaft and means acting between the drive shaft and at least a proportion of said rollers adjacent therewith to drive said rollers, characterised in that said second mentioned means comprises a plurality of sleeves rotatably mounted on said drive shaft for frictional engagement therewith, said sleeves being restrained from movement axially along the drive shaft and said means further including resilient drive belts looped between the sleeves and at least a proportion of the adjacent rollers and acting directly on the surface of said sleeves, each said sleeve being adapted to drive at least two rollers adjacent therewith.

The invention further provides a method for transporting articles wherein the articles are carried by the rollers of a driven roller conveyor, at least a proportion of which rollers are driven by resilient drive belts frictionally connected to a common drive means running at an angle to the rollers, characterised in that the drive means consists of a plurality of drive sleeves rotatably carried on a drive shaft and powered by the frictional resistance between the sleeves and the shaft, each sleeve being arranged to drive a section of the conveyor including at least two driven rollers and being restrained from axial movement along the drive shaft, said drive belts being looped about the rollers and sleeves and acting directly on the surface of the sleeves, stoppage of an article being transported causing the drive sleeve immediately below the said article and all rollers associated with said sleeve to stall, thereby preventing further articles from entering that section of the conveyor.

In a preferred embodiment each sleeve is associated with a group of rollers including at least two and up to about eight or more said rollers, the sleeve may be connected to each roller in the said group by a tensioned drive belt or only to certain of the said rollers, for example alternate rollers, provided that the last roller in each group is a driven roller connected directly or indirectly to the sleeve by a drive belt, e.g. the last roller may be driven by a belt looped about an adjacent roller which is driven by the drive sleeve.

The rollers may each have an associated drive-pulley about which the drive belt is looped, or they may each contain a circumferential groove at or near one end arranged to receive the said drive belt.

The drive to the rollers is by frictional drag acting between the drive shaft the rotatable sleeve, the tensioned drive belt and the rollers.

The invention takes advantage of the fact that only small forces acting on the conveyor rollers are necessary to cause an article, such as a package, placed on drive rollers to be moved and transported along a horizontal plane.

The material forming the rotatable sleeve and the tension in the drive belt are therefore arranged to provide sufficient friction between the driving components to transmit a force to the rollers which will cause a package, of maximum weight for which the conveyor is designed, placed on the conveyor to be transported between driven rollers. That is, the frictional resistance between the drive shaft and the sleeve must be just greater than the rolling resistance of the rollers. Generally this is achieved by forming the sleeve of low-friction material or by using a continuous or discontinuous lining on the inside surface of the sleeve or the outside surface of the drive shaft. Preferably the sleeve is a steel tube carried on the drive shaft by low friction bearing bushes at each end.

The friction drag existing between the rotatable sleeve and the drive shaft and therefore the maximum force available for driving the rollers, can additionally be controlled by varying the diameters of the sleeve and/or drive shaft to change the arc of contact therebetween of varying the belt diameter or initial tension.

We have found that when a package, being transported by the conveyor of the present invention, is stopped at some point along the conveyor, the frictional resistance between the package and the rollers is sufficient to bring the driven rollers in contact with the package at that point to rest. Because of the low friction existing between the sleeve and the drive shaft rotation of the sleeve is also arrested with the result that all of the rollers in the group being driven by that particular sleeve also stop.

The package being transported by the next adjacent up-line group of rollers is then moved onto the stationary rollers and stops without colliding with the already stationary package. Either that second package, or the next succeeding package in line, will then cause the said next up-line group of rollers to be arrested. Packages thus accumulate in a spaced-out arrangement without damaging collisions occuring.

When the resistance to movement of the first package is removed, transportation of the accumulated packages restarts.

The conveyor may include means to permit sections of the conveyor to be selectively halted by providing a non-rotatable friction member capable of bearing against a sleeve, or against drive belts acting on the sleeve, with sufficient pressure to provide a force exceeding the frictional resistance between the sleeve, or the low friction bearings carrying the sleeve, and the drive shaft to cause the sleeve and associated rollers to stall.

Figure 2:
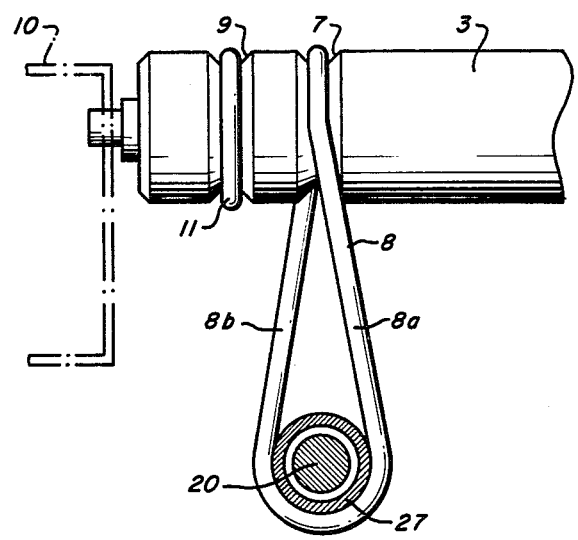

A preferred embodiment of the present invention will now be described with reference to the accompanying drawings in which:

FIG. 1 is a representation of a fragment of a roller conveyor embodying the invention, and FIG. 2 is a section at right angles to FIG. 1 along the lines A–A'.

The conveyor comprises a plurality of rollers 1 to 6 mounted for free rotation in a frame member having parallel support members 10 running the length of the conveyor.

A drive shaft 20 is located at right angles to the rollers 1 to 6 and runs parallel with the frame member being supported in bearings 21 carried on cross members 22 positioned along the shaft at distances of one meter apart. Midway between each bearing the shaft carries an integral collar portions 23 which substantially increase the diameter of the shaft at that point, the collar including two flat faces 24 and 25.

Steel drive sleeves 26, 27 and 28 each defining a section of the conveyor, are carried by the drive shaft and supported thereon by nylon bushes, 30, 31, 32 and 33 and having flanges 34, 35, 36 and 37 respectively. The bushes are mounted on the drive shaft for slipping engagement therewith. A running clearance only is provided between flanges 34 to 37 and the faces of the collars 23 or bearings 21.

In this embodiment each section of the conveyor includes six rollers driven directly from the sleeves as hereinafter described.

Rollers 1, 3, 4 and 6 each contain grooves 7 which are in alignment with the drive shaft. Drive is transmitted from the drive sleeves 26, 27 and 28 to the rollers by means of twisted drive belts 8 which are located in grooves 7 of the rollers and are in direct contact with the surface of the drive sleeves.

Rollers 2 and 5 are slave rollers being positioned over a bearing (21) or a collar (23). These rollers include grooves 9 (not shown) corresponding to an equivalent groove 9' included in rollers 3 and 4 and are driven by drive belts 11 from rollers 3 and 4.

Drive shaft 20 is driven by any conventional means (not shown). When a conveyor is running under "no load conditions" i.e. not transporting any articles, the frictional resistance between the shaft 20 and for example, the bushes 31 and 32 supporting the drive sleeve 27, the sleeve 27, belts 8 and rollers 3 and 4 is sufficient to cause the rollers to rotate at a constant speed, the tension in both legs, (8a and 8b) of belts 8 being equal.

When a load is placed on the conveyor for example a package "A" the frictional resistance between package "A" and the rollers tends to cause the rollers with which it is in contact to stall and increased drive power is required for the rollers to transport packages. To provide this increased power the tension in the drive belts 8 increases. This increase initially takes place in the downward moving leg, 8b of belt 8, (referring for example to roller 3) with a reduction in tension of the upward moving leg 8a. To compensate for this imbalance in tension in the legs of the belt, the belt tends to creep along the drive sleeve in the direction as the rotation of the rollers until the tension in both legs equalises at a higher level than under no load conditions. The rollers are then able to move the packages forward at the same speed as the rotation of the rollers. The effect of an increase in tension of the belt is to pull the drive sleeve 27 and bushes 31 and 32 against the drive shaft 20, thereby increasing the frictional resistance between the shaft and the bushes reducing any tendency to slip. The movement of the belt acting on the sleeve also increases the force acting longitudinally of the sleeve in the opposite direction to the direction of rotation of the rollers the result of which, for example, is to cause sleeve 27 to move towards collar 23 causing the flange of bush 32 to press against face 25 of collar 23, thereby providing extra drive to the sleeve.

It is clear, therefore, that the sleeves should be restrained from any tendency to move axially along the drive shaft. If such movement were permitted the forces acting longitudinally of the sleeve would cause the sleeve to move along the shaft rather than the belt being permitted to creep along the sleeve.

It can be readily understood that the greater the tension in the belts the greater the forces acting on the bushes and flanges to increase the frictional resistance between the bushes and the drive shaft. However because the bushes are made of a low friction material, nylon, a point is reached when the forces acting on the drive sleeves exceed the frictional resistance between the bushes and the drive shaft. At this point slippage occurs between the bushes and the drive sleeves and rollers associated therewith are stalled. The drive shaft 20 continues to rotate however and drive other sleeves and rollers associated therewith.

Such a situation will occur if package "A" is obstructed during its movement along the conveyor and caused to stop, or an operator is in contact with the moving parts of the conveyor. The pressure acting on rollers 2 and 3 for example, derived from the frictional resistance between the rollers and the package, is then sufficient to overcome the frictional resistance between bushes 31 and 32 and drive shaft 20 with a result that sleeves 27 and rollers 2, 3, 4 and 5 are stalled and that section of the conveyor is halted. Since the sleeve 27 is no longer rotating with the shaft 20 the natural hysteresis in the drive belts 8 causes them to creep back along the sleeve to their initial position, releasing the tension in the belts and thus reducing the pressure acting on the stationary package.

A second package "B" being transported by rollers associated with drive shaft 28 passes from the last of those rollers, 6, onto the stationary rollers 4 and 5 and stops. Since packages "B" has stopped whilst still in contact with roller 6 that roller also stalls and causes sleeve 28 and the remaining rollers associated therewith to stall also thus halting the next adjacent section of the conveyor.

Any succeeding packages moving along the conveyor are also stopped, halting further sections of the conveyor and a line of stationary packages builds up i.e. a low pressure accumulation of packages occurs.

As soon as the obstruction is removed from in front of package "A" the force acting on rollers 1, 2 and 3 causing their rolling resistance to exceed the frictional resistance between sleeve 27 and drive shaft 20 is reduced, sleeve 27 is therefore again enabled to drive the rollers and packages "A" or "B" and forwarded along the conveyor. As a result sleeve 28 again provides drive for roller 6 and the other rollers in that section permitting the next package upstream to be forwarded and so on until the whole line of packages is again moving along the conveyor.

It can be appreciated that if the number of slave rollers in each section of conveyor is increased then power available for transporting packages is reduced. By the same token the force necessary to stall a section of conveyor is also reduced. Thus the conveyor can be designed to transport light weight packages but to operate as described above.

I claim:

1. In a roller conveyor including a frame, a plurality of article transporting rollers carried by said frame for free rotation therein and a drive shaft supported for rotation and extending adjacent said rollers and at an angle thereto, wherein the improvement comprises
a plurality of drive sleeves rotatably carried on the said drive shaft for frictional engagement therewith, said drive sleeves each having two end portions and a cylindrical surface extending between said end portions,
stop means located on and rotatable with said drive shaft to restrain said drive sleeves from axial movement along said shaft and to provide drive between the end portions of said sleeve and said stop means when the rollers are transporting an article, there being a running clearance between said end portions of said sleeves and said stop means when said driven rollers are not transporting an article,
a plurality of resilient drive belts looped between said sleeves and at least some of said rollers, being driven rollers, to transmit power from said drive shaft to said driven rollers, said belts acting directly on said sleeves and being free to move along the cylindrical surface of the said sleeves to take up a stable position thereon, and
each said sleeve being arranged to drive at least two said rollers.

2. A roller conveyor according to claim 1 wherein under the application of a load to said driven rollers, one of said sleeve ends engages said stop means through a change in the tension in said resilient belt resulting in an increase in driving power transmitted from said drive shaft to said drive sleeve.

3. A roller conveyor according to claim 1 or 2 wherein each said sleeve comprises a tube carried on said drive shaft by low friction bearings located at each end thereof, said bearings provided a face for engagement with said stop means.

4. A roller according to claim 2 wherein said low friction bearings are nylon bushes.

5. A roller conveyor according to claim 2 wherein said stop means includes an annular collar located on said drive shaft for rotation therewith.

6. A roller conveyor according to claim 2 wherein said stop means includes a bearing supporting said drive shaft for rotation therein.

7. A roller conveyor according to claim 1 or 2 wherein a proportion of said rollers are slave rollers and are driven by drive belts looped about said rollers and said driven rollers.

8. A method of transporting articles in which said articles are carried by the rollers of a driven roller conveyor, at least a proportion of which rollers are driven by resilient drive belts acting between said rollers and a common drive shaft running at an angle to the rollers, comprising, providing drive between said drive shaft and said drive belts through a plurality of drive sleeves rotatably carried on said drive shaft for frictional engagement therewith, providing a generally smooth, cylindrical outer surface for each of said sleeves, each said sleeve being arranged to receive at least two drive belts for imparting drive to respective said rollers, said drive belts acting directly on said smooth cylindrical surfaces of said respective sleeves to take up a stable position thereon in response to an increase in belt tension arising from resistance to rotation of said respective rollers when transporting an article, providing stop means located on and rotatable with said shaft to restrain said sleeves from axial movement along said shaft, providing a running clearance between end portions of said sleeves and an adjacent stop means when said respective rollers are not transporting an article, providing increased driving power from said drive shaft to said sleeves when said respective rollers are transporting an article by engagement of said end portions of the sleeve with said stop means consequent upon said increase in belt tension, wherein stoppage of an article being transported causing the drive sleeve immediately below the said article and all rollers associated with said sleeve to stall, thereby preventing further articles from being transported by said rollers.

9. A method according to claim 8 wherein the drive sleeves are steel tubes and including the further step of carrying said drive sleeves on the drive shaft by providing low friction bearing bushes located at each end of said drive sleeves.

* * * * *